United States Patent [19]

Filsinger et al.

[11] Patent Number: 4,779,702

[45] Date of Patent: Oct. 25, 1988

[54] ARRANGEMENT FOR THE SWITCHING OF DEVICES IN MOTOR VEHICLES

[75] Inventors: Reinhard Filsinger, Wernau; Heinz Leiber, Oberriexingen, both of Fed. Rep. of Germany

[73] Assignee: Daimler-Benz Aktiengesellschaft, Stuttgart, Fed. Rep. of Germany

[21] Appl. No.: 116,225

[22] Filed: Nov. 3, 1987

[30] Foreign Application Priority Data

Nov. 3, 1986 [DE] Fed. Rep. of Germany ....... 3637405

[51] Int. Cl.$^4$ ................................................ B60T 8/02
[52] U.S. Cl. .................................... 180/313; 180/197; 303/100
[58] Field of Search ................ 180/197, 313; 280/707; 303/100; 152/208, 231

[56] References Cited

U.S. PATENT DOCUMENTS

| | | | |
|---|---|---|---|
| 4,138,709 | 2/1979 | Colwill | 361/180 |
| 4,402,047 | 8/1983 | Newton et al. | 303/100 |
| 4,477,124 | 10/1984 | Watanabe | 303/100 |
| 4,583,173 | 4/1986 | Odlen et al. | 180/197 |

FOREIGN PATENT DOCUMENTS

| | | |
|---|---|---|
| 0034315 | 2/1981 | European Pat. Off. |
| 3145866 | 7/1982 | Fed. Rep. of Germany |
| 2706278 | 10/1987 | Fed. Rep. of Germany |

OTHER PUBLICATIONS

Automatic Locking Differential, Electronic Traction Control and 4MATIC Three Systems in Damsler Benz, "Active Safety Concept", Part 1, Gaus et al., ATZ-88 (1986) 273+.

Primary Examiner—Ross Weaver
Attorney, Agent, or Firm—Barnes & Thornburg

[57] ABSTRACT

An arrangement for the switching of devices in motor vehicles, particularly for the changing of switching thresholds in driving or braking control systems or for the limiting of the steering angle of rear axle steering systems, as a function of snow chains that are in place on at least one wheel or the wheels of one axle that are detected by at least one sensor having an amplifier, an evaluating circuit and a threshold value switch that are connected behind it.

7 Claims, 1 Drawing Sheet

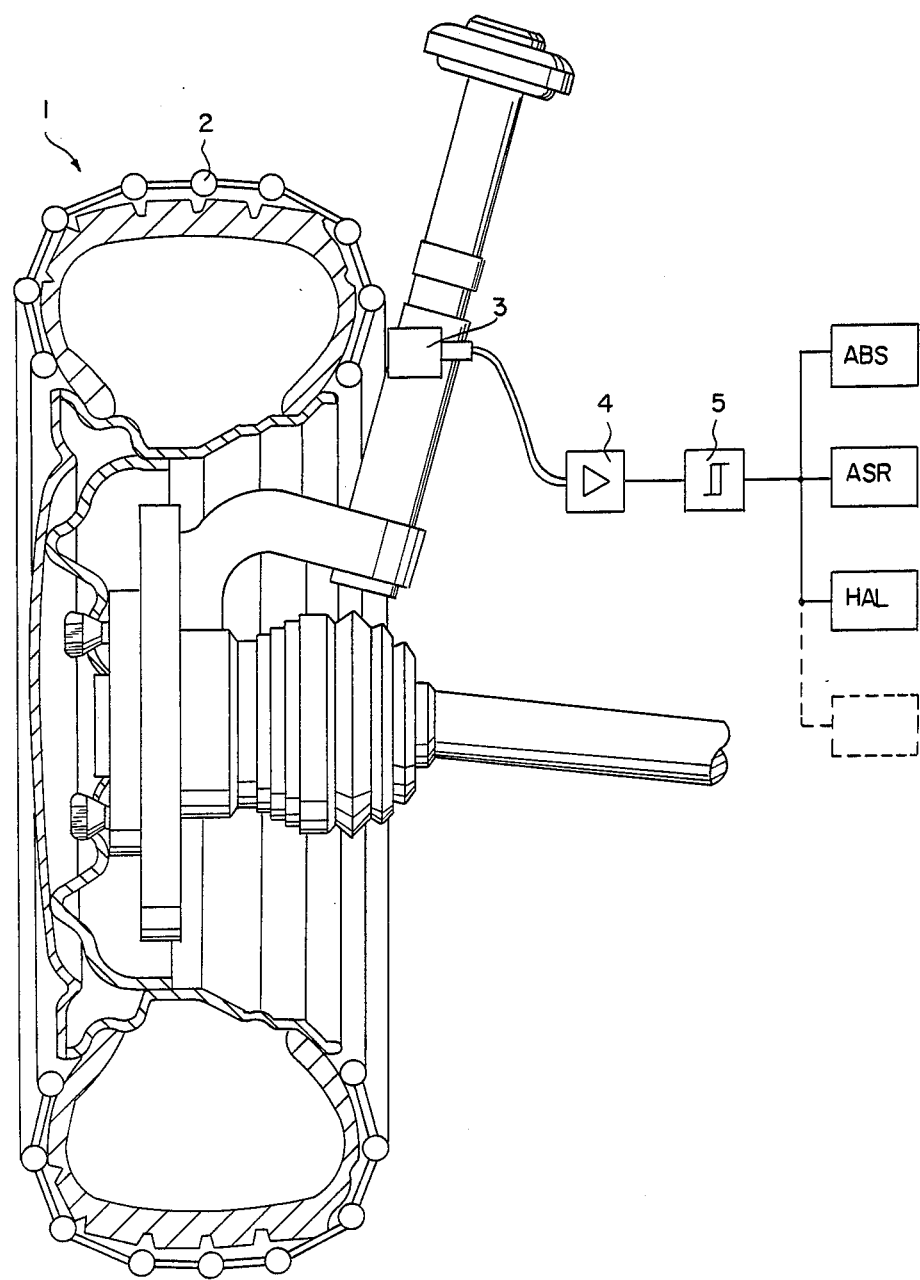

— 4,779,702 —

ARRANGEMENT FOR THE SWITCHING OF DEVICES IN MOTOR VEHICLES

BACKGROUND AND SUMMARY OF INVENTION

The present invention relates to an arrangement for the switching of devices in motor vehicles such as driving, braking or steering control systems as a function of whether vehicle wheels are equipped with snow chains.

Various control systems in motor vehicles, such as the antilock system or the wheel slip control system, depend on the condition of the driven wheels or the wheels to be braked. This is particularly true when the wheels are equipped with snow chains. Antilock systems (ABS), for example, would have a better braking effect if, when snow chains are in place, the wheel slip threshold values were increased.

In wheel slip control system (ASR), a manually operable switch is provided at the dashboard of the vehicle. By the switching-on of this switch, the threshold values for the braking and engine control can be changed.

When four-wheel or rear-wheel steering is used, a switching is advantageous when snow chains are in place. In rear wheel steering, a problem exists with respect to the dimensioning of the wheel house that depends on the wheel steering angle. In high-efficiency rear wheel steering systems, the wheel house must be enlarged which affects the design of the rear seat bench and of the trunk of the vehicle. If snow chains are also mounted on the wheels, the wheel house would have to be enlarged to an unacceptable degree. To account for this by means of a signal, the functioning range of the rear wheel control, when snow chains are in place, could be limited and as a result, a normally dimensioned wheel house could be maintained. This signal can be generated by means of the known switch. However, when it is forgotten to actuate the switch after the chains have been put in place, or to open the switch again, after the chains have been removed, this may result in a deteriorating braking or starting behavior or in a rubbing of the chains at the wheel house.

It is therefore an objective of the present invention to improve the arrangement for switching of the threshold or limit values so that the presence or absence of snow chains is securely accounted for.

This and other objectives are achieved in the present invention by providing an arrangement for switching driving, braking and control systems in a motor vehicle as a function of the presence of whether snow chains are mounted on the wheels, this arrangement having at least one sensor assigned to a driven wheel. The sensor scans the wheel for the presence of snow chains, and is arranged at an element of the wheel suspension.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a cross-section of a vehicle wheel with a preferred embodiment of the present invention.

DETAILED DESCRIPTION OF THE DRAWINGS

The drawing shows a sectional view of a vehicle wheel 1, in which the wheel rim and tire are visible, but not shown in detail, as well as the driving axle, the bearing, etc. A snow chain 2 is mounted in place on this vehicle wheel 1. At a suitable point, in the illustrated embodiment at a damper strut of the indicated wheel suspension, a sensor 3 is arranged, behind which a signal amplifier 4 having an integrated evaluating circuit, and a threshold value switch 5 are connected. The output of the threshold value switch 5 is connected with corresponding inputs of an antilock system ABS and/or a wheel slip control system ASR or a rear wheel steering system HAL or other units that are shown by an interrupted line.

The sensor 3, signal amplifier 4 and threshold value switch 5 are conventional items. For use as the sensor 3, a preferred embodiment uses an induction sensor, while further preferred embodiments use a magnetic-field sensitive sensor or an ultrasonic sensor.

When a snow chain 2, which usually comprises steel, is pulled onto the wheel 1 as shown, this is detected by the sensor 3, and amplified by signal amplifier 4. The evaluated and amplified signal forms a continuous signal at the output of the threshold value switch 5, at least when the wheel is turning. This threshold value signal is evaluated in electronic circuits that follow and is used for the switching of threshold values, for limiting a steering range, etc.

When so-called starting aids are used that consist essentially of plastic gripping means, it is contemplated that steel inserts be worked into these gripping means or that steel rings be placed around the webs or belts in such a way that they can be clearly detected by the sensor.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An arrangement for switching at least one of driving, braking and steering control systems in motor vehicles as a function of whether vehicle wheels are equipped with or without snow chains, said arrangement comprising:
at least one sensor means assigned to a driven wheel for scanning said wheel for presence of said snow chains, said sensor means being arranged at an element of said wheel suspension.

2. An arrangement according to claim 1, wherein said sensor means is an inductive sensor.

3. An arrangement according to claim 1, wherein said sensor means is a magnetic-field-sensitive sensor.

4. An arrangement according to claim 1, wherein said sensor means is an ultrasonic sensor.

5. An arrangement according to claim 1, wherein said sensor means includes signal amplifier means, an evaluating circuit, and threshold value switch means for emitting a signal when said snow chains are in place while said wheel is turning.

6. An arrangement according to claim 1, wherein said element is a spring strut.

7. An arrangement according to claim 1, wherein said element is a damper strut.

* * * * *